US010549616B2

(12) United States Patent
Edgar

(10) Patent No.: US 10,549,616 B2
(45) Date of Patent: Feb. 4, 2020

(54) TARPAULIN SUPPORT ASSEMBLY

(71) Applicant: Michael Edgar, Toms River, NJ (US)

(72) Inventor: Michael Edgar, Toms River, NJ (US)

( * ) Notice: Subject to any disclaimer, the term of this patent is extended or adjusted under 35 U.S.C. 154(b) by 0 days.

(21) Appl. No.: 15/978,633

(22) Filed: May 14, 2018

(65) Prior Publication Data

US 2019/0344648 A1 Nov. 14, 2019

(51) Int. Cl.
*B60J 7/08* (2006.01)
*B60J 7/185* (2006.01)
*B60J 7/16* (2006.01)

(52) U.S. Cl.
CPC ........... *B60J 7/1607* (2013.01); *B60J 7/1856* (2013.01)

(58) Field of Classification Search
CPC ... B60J 7/16; B60J 7/1607; B60J 7/085; B60J 7/1856; B60J 7/068
USPC ................................. 296/98, 100.14, 100.16
See application file for complete search history.

(56) References Cited

U.S. PATENT DOCUMENTS

| 4,341,416 A * | 7/1982 | Richard | B60J 7/085 296/100.15 |
| 4,874,196 A * | 10/1989 | Goldstein | B60J 7/085 296/98 |
| 5,340,187 A | 8/1994 | Haddad, Jr. | |
| 5,388,882 A | 2/1995 | Russell | |
| 5,482,347 A * | 1/1996 | Clarys | B60J 7/085 296/98 |
| 5,752,735 A | 5/1998 | Fleming | |
| 5,829,818 A * | 11/1998 | O'Daniel | B60J 7/085 296/98 |
| 6,237,985 B1 | 5/2001 | O'Brien | |
| 6,695,382 B2 | 2/2004 | Ciferri et al. | |
| 7,350,846 B2 | 4/2008 | Smith | |
| 8,465,080 B2 | 6/2013 | Searfoss | |

* cited by examiner

*Primary Examiner* — Dennis H Pedder

(57) ABSTRACT

A tarpaulin support assembly includes a trailer that has a first lateral wall and a second lateral wall. A tarpaulin deploying unit is movably coupled to the trailer, and the tarpaulin deploying unit includes a pair of arms that are each pivotally positioned on a respective one of the first lateral side and the second lateral side of the trailer. Each of the arms is urgeable into a selected angular orientation on the trailer to deploy and retract a tarpaulin over the trailer. A pair of support units is provided and each of the support units is coupled to the trailer. Each of the support unit has a respective one of the arms is pivotally coupled thereto. Moreover, each of the support units is retainable at a selected angular position with respect to the trailer such that each of the arms is supported at the selected angular position. Each of the support units transfers the weight of the tarpaulin into the trailer thereby inhibiting the arms from being damaged.

11 Claims, 5 Drawing Sheets

TARPAULIN SUPPORT ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR Not Applicable

BACKGROUND OF THE INVENTION (1) Field of the Invention (2) Description of Related Art Including Information Disclosed Under 37 CFR 1.97 and 1.98

The disclosure and prior art relates to support devices and more particularly pertains to a new support device for enhancing the service life of tarpaulin deploying units on trailers.

BRIEF SUMMARY OF THE INVENTION

An embodiment of the disclosure meets the needs presented above by generally comprising a trailer that has a first lateral wall and a second lateral wall. A tarpaulin deploying unit is movably coupled to the trailer, and the tarpaulin deploying unit includes a pair of arms that are each pivotally positioned on a respective one of the first lateral side and the second lateral side of the trailer. Each of the arms is urgeable into a selected angular orientation on the trailer to deploy and retract a tarpaulin over the trailer. A pair of support units is provided and each of the support units is coupled to the trailer. Each of the support unit has a respective one of the arms is pivotally coupled thereto. Moreover, each of the support units is retainable at a selected angular position with respect to the trailer such that each of the arms is supported at the selected angular position. Each of the support units transfers the weight of the tarpaulin into the trailer thereby inhibiting the arms from being damaged.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
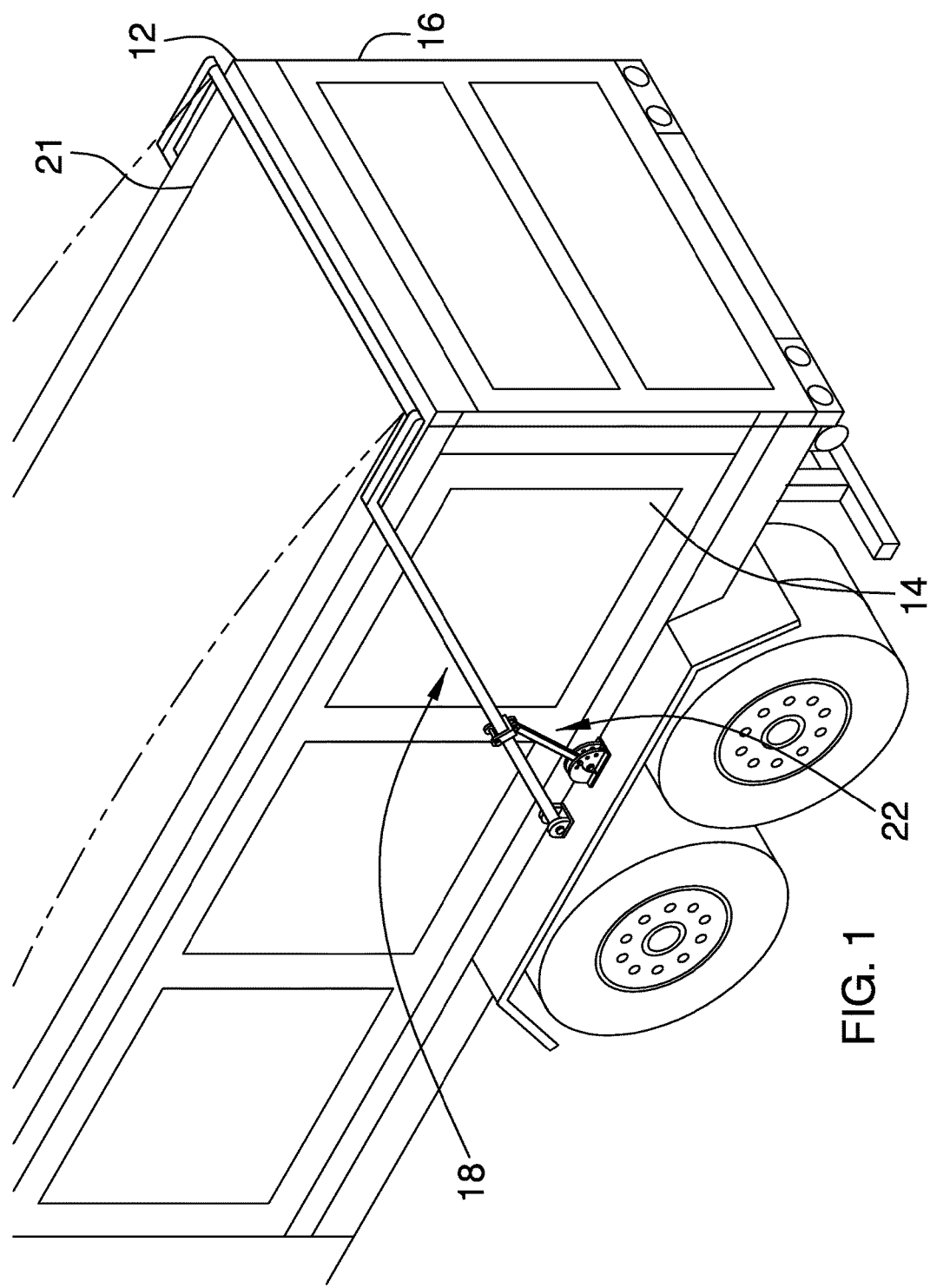
FIG. 1 is a top perspective view of a tarpaulin support assembly according to an embodiment of the disclosure.
Figure 2:
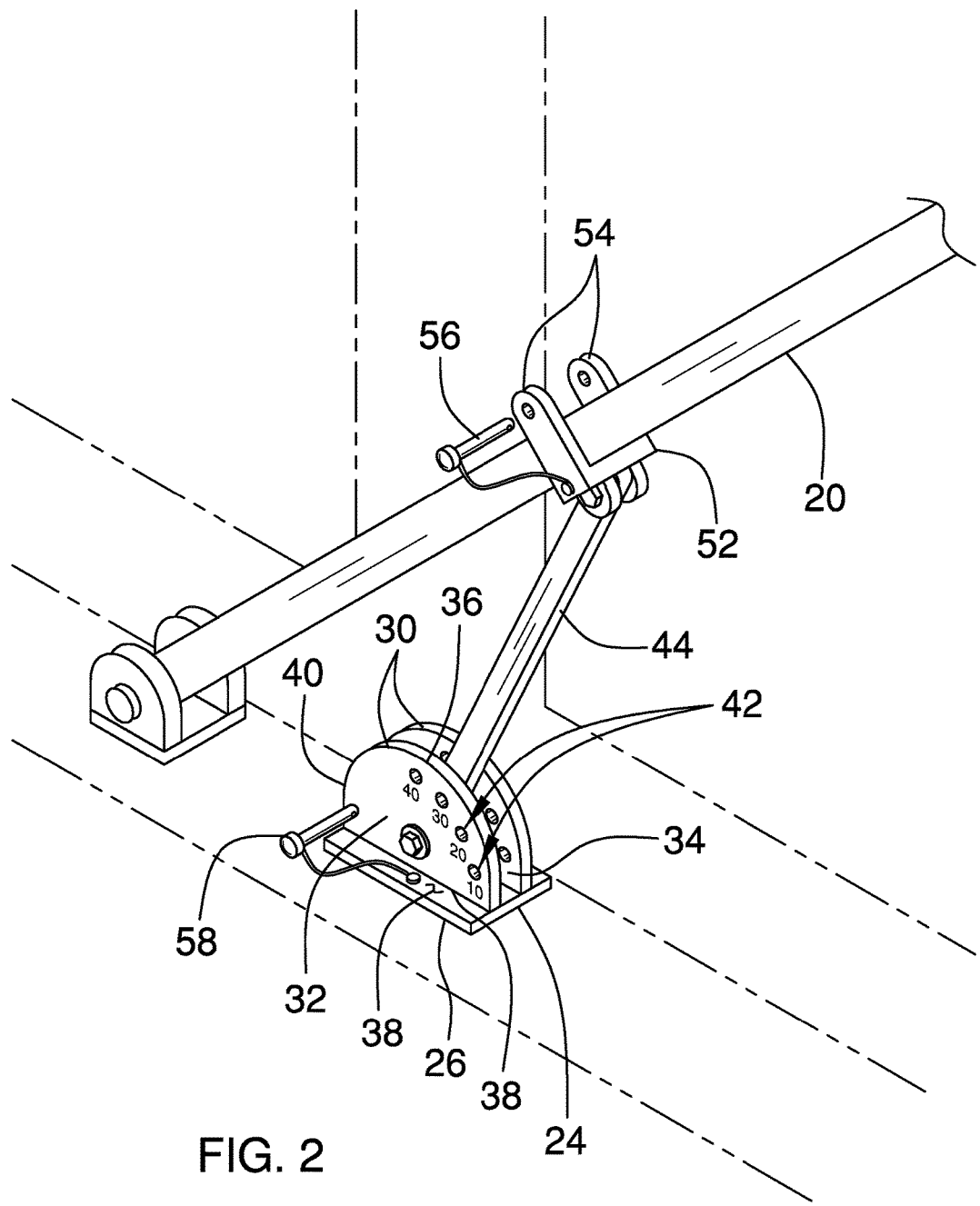
FIG. 2 is a perspective view of support unit of an embodiment of the disclosure.
Figure 3:
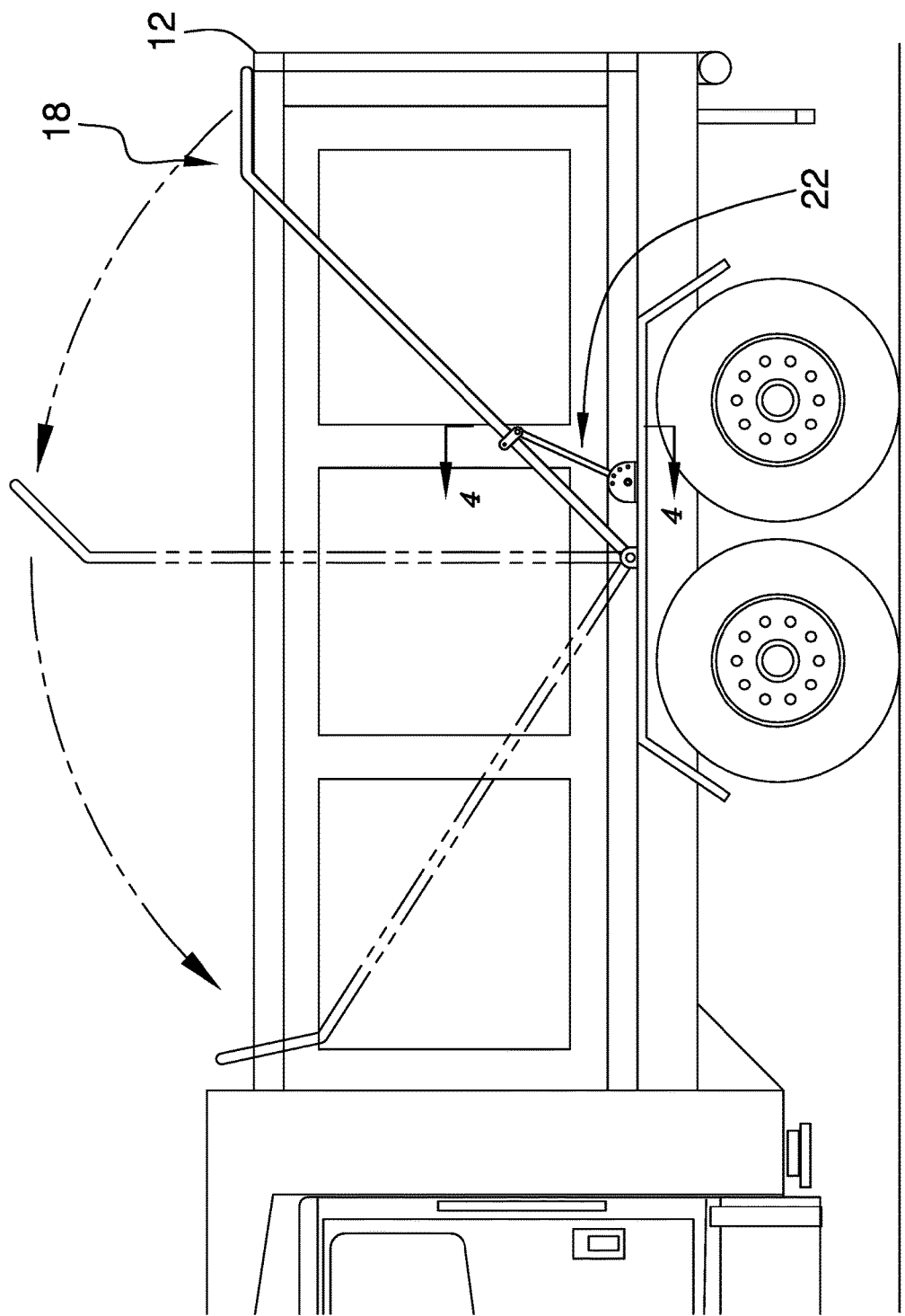
FIG. 3 is a left side view of an embodiment of the disclosure showing a tarpaulin deploying unit being moved between a deployed positon and a stored position.
Figure 4:
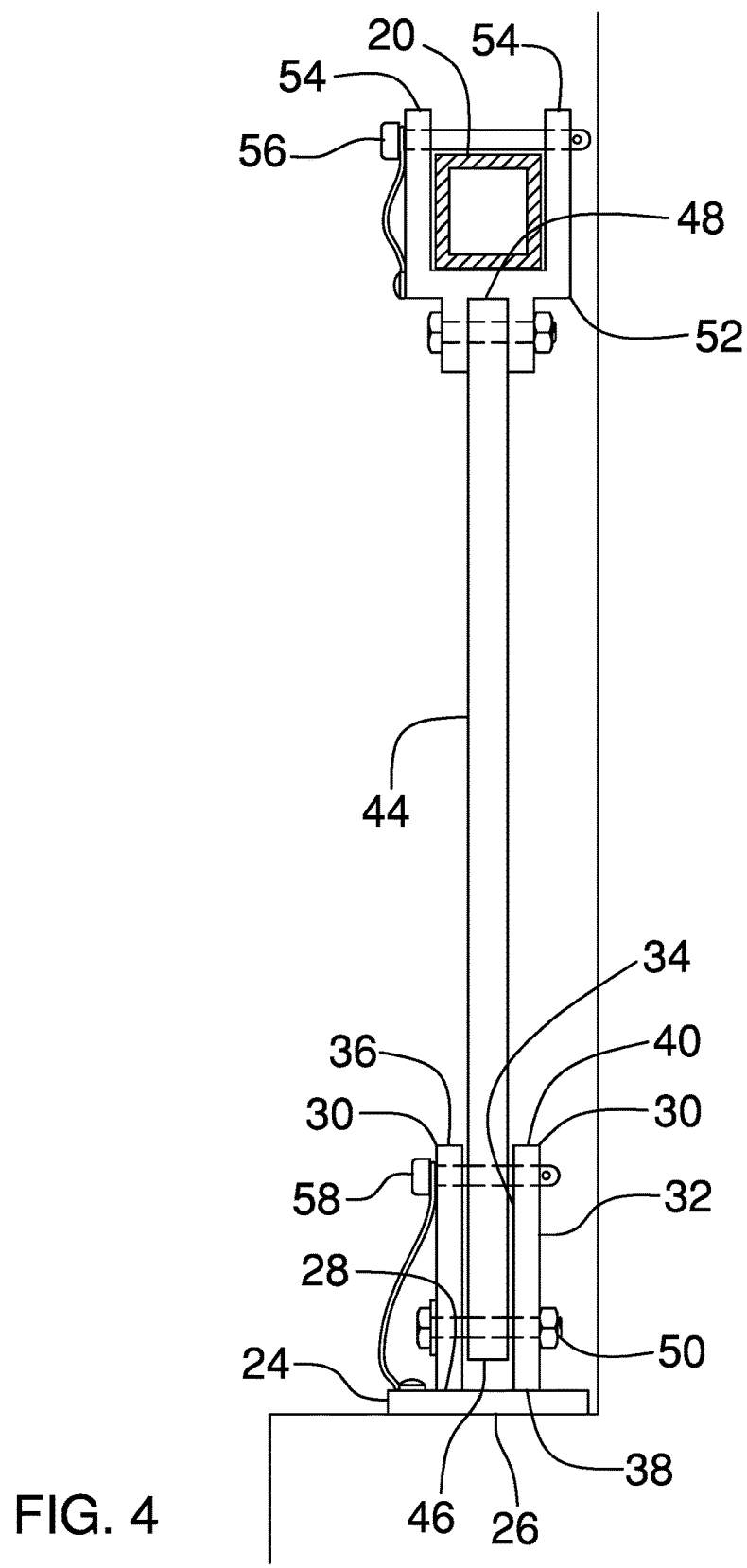
FIG. 4 is a cross sectional view taken along line 4-4 of FIG. 3 of an embodiment of the disclosure.
Figure 5:
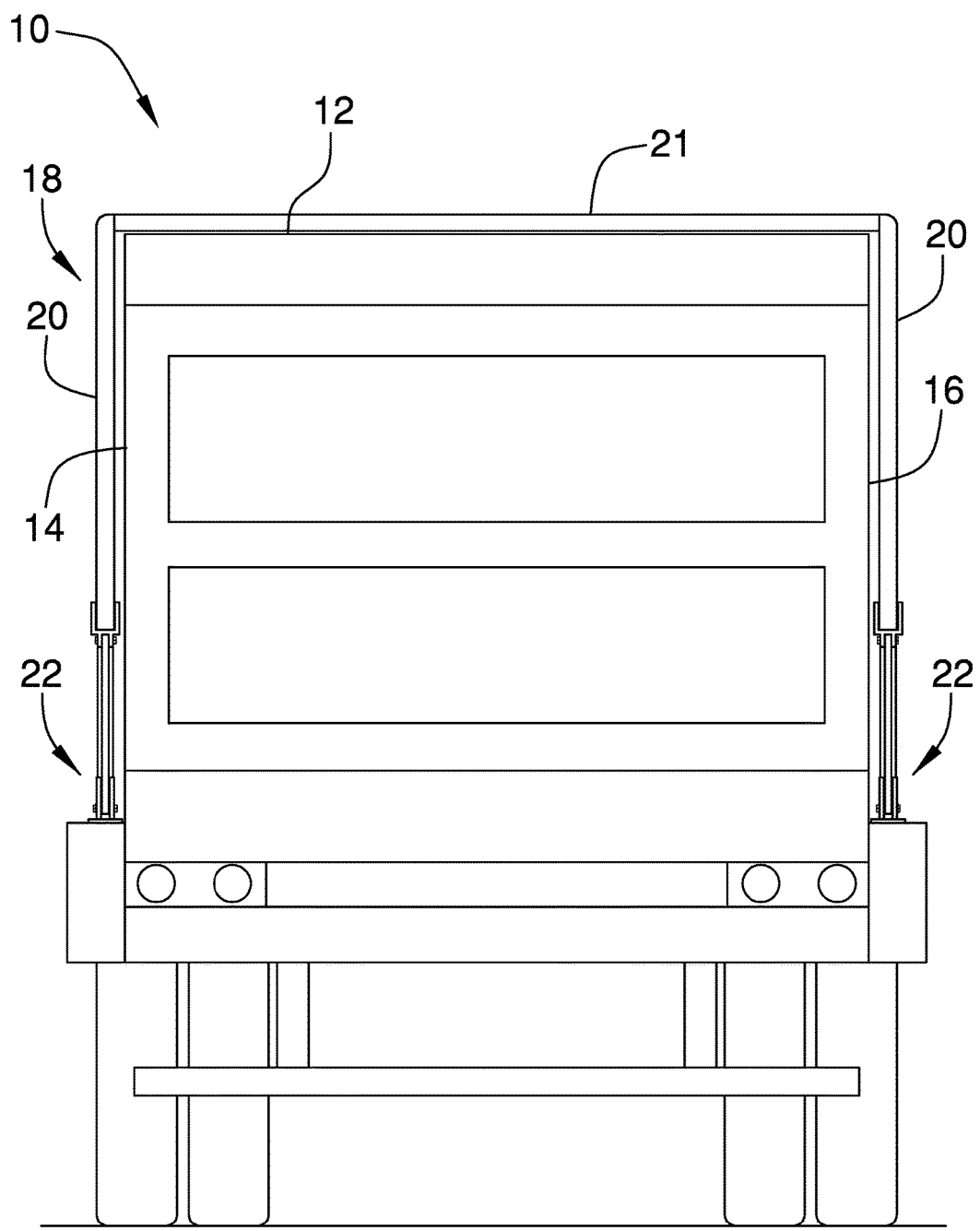
FIG. 5 is a back view of an embodiment of the disclosure.

With reference now to the drawings, and in particular to FIGS. 1 through 5 thereof, a new support device embodying the principles and concepts of an embodiment of the disclosure and generally designated by the reference numeral 10 will be described.

As best illustrated in FIGS. 1 through 5, the tarpaulin support assembly 10 generally comprises a trailer 12 that has a first lateral wall 14 and a second lateral wall 16. A tarpaulin deploying unit 18 is provided and the tarpaulin deploying unit 18 is movably coupled to the trailer 12. The tarpaulin deploying unit 18 includes a pair of arms 20 that are each pivotally positioned on a respective one of the first lateral wall 14 and the second lateral wall 16 of the trailer 12. Each of the arms 20 is urgeable into a selected angular orientation on the trailer 12 to deploy and retract a tarpaulin 21 over the trailer 12. The trailer 12 may be a roll off container, such as a garbage dumpster or the like, that is manufactured in a variety of specific lengths. Moreover, the trailer 12 may have a storage capacity ranging between 10.0 cubic yards, 20.0 cubic yards, 30.0 cubic yards or 40.0 cubic yards.

A pair of support units 22 is provided and each of the support units 22 is coupled to the trailer 12. Each of the support units 22 has a respective one of the arms 20 pivotally coupled thereto. Each of the support units 22 is retainable at a selected angular position with respect to the trailer 12 such that each of the arms 20 is supported at the selected angular position. Each of the support units 22 transfers the weight of the tarpaulin 21 into the trailer 12 thereby inhibiting the arms 20 from being damaged. The tarpaulin deploying unit 18 may be a retractable tarpaulin deploying unit 18 of any conventional design.

Each of the support units 22 comprises a base 24 that has a first surface 26 and a second surface 28. The first surface 26 is coupled to the trailer 12 having the second surface 28 lying on a plane that is horizontally oriented. Each of the support units 22 includes a pair of disks 30 and each of the disks 30 has a first side 32, a second side 34 and an outer edge 36 extending therebetween. The outer edge 36 has a lower side 38 and an upper side 40, the upper side 40 of each of the disks 30 is concavely arcuate and the lower side 38 of each of the disks 30 is straight. The lower side 38 of each of the disks 30 is coupled to the second surface 28 of the base 24 having each of the disks 30 extending upwardly from the base 24. Additionally, the disks 30 are spaced apart from each other and are aligned with each other on the base 24.

Each of the disks 30 has a plurality of apertures 42 extending through the first side 32 and the second side 34. Each of the apertures 42 in a first one of the disks 30 is aligned with a respective one of the apertures 42 in a second one of the disks 30. The apertures 42 on each of the disks 30 are spaced apart from each other and are distributed along the upper side 40 of the respective disk. Moreover, the apertures 42 in each of the disks 30 forms an arc extending upwardly from the second surface 28 of the base 24. Each of the apertures 42 defines a respective one of a minimum position, a maximum position or a respective one of a plurality of medial positions.

Each of the support units 22 includes a member 44 that has a first end 46 and a second end 48, and the first end 46 is positioned between the disks 30. A fastener 50, such as a bolt or pin, extends through each of the disks 30 and pivotally engages the first end 46 of the member 44 such that the member 44 is pivotally positioned between the disks 30. The member 44 is alignable with selected ones of the apertures 42 in the disks 30. A saddle 52 is pivotally coupled to the second end 48 of the member 44 and the saddle 52 slidably receives a respective one of the arms 20 of the tarpaulin deploying unit 18. The saddle 52 includes a pair of uprights 54 that each extends away from the member 44. Additionally, the respective arm 20 is positioned between the uprights 54 thereby restricting lateral motion of the respective arm 20 in the saddle 52. A first pin 56 is extendable through each of the uprights 54 to retain the respective arm 20 between the first pin 56 and the member 44. In this way the respective arm 20 is inhibited from leaving the saddle 52.

A second pin 58 is extendable through a selected one of the apertures 42 in each of the disks 30 and engages the member 44. In this way the member 44 is retained in a selected one of the minimum, maximum or medial positions. The member 44 transfers the weight of the tarpaulin 21 from the respective arm into the base 24. The tarpaulin 21 is stretched a minimum distance when the member 44 is retained at the minimum position thereby facilitating the tarpaulin 21 to cover a trailer 12 has a minimum length, such as a 10.0 yard roll off container. The tarpaulin 21 is stretched to a maximum distance when the member 44 is retained at the maximum distance thereby facilitating the tarpaulin 21 to cover a trailer 12 has a maximum length, such as 40.0 yard roll off container. Additionally, the tarpaulin 21 is stretched to differing medial lengths when the member 44 is retained at a selected one of the medial positions thereby facilitating the tarpaulin 21 to cover a trailer 12 has a corresponding medial length. Thus, the tarpaulin 21 is facilitated to cover a trailer 12 that has a length of 20.0 yards and 30.0 yards.

In use, the tarpaulin deploying unit 18 is positioned into a deployed position to stretch the tarpaulin 21 over the trailer 12. The member 44 on each of the support units 22 is positioned against the respective arm 20 and the first pin 56 corresponding to each of the support units 22 is positioned through the saddle 52 of the corresponding support unit 22. Thus, the member 44 on each of the support units 22 is aligned with a respective one of the apertures 42 that corresponds to the size of the trailer 12. The second pin 58 on each of the support units 22 is extended through the apertures 42 with which the member 44 on each of the support units 22 is aligned. In this way the member 44 is retained in alignment with the aperture 42 thereby facilitating the member 44 to transfer weight of the tarpaulin 21 from the respective arm 20 into the trailer 12. In this way the service life of the tarpaulin deploying unit 18 is enhanced by inhibiting the arms 20 from being bent, deformed or otherwise damaged by forces generated by the tarpaulin 21 when the tarpaulin 21 is stretched to cover the trailer 12.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A tarpaulin support assembly being configured to support tarpaulin arms at a selected angle on a trailer, said assembly comprising:
   a trailer having a first lateral wall and a second lateral wall;
   a tarpaulin deploying unit being movably coupled to said trailer, said tarpaulin deploying unit including a pair of arms each being pivotally positioned on a respective one of said first lateral side and said second lateral side of said trailer, each of said arms being urgeable into a selected angular orientation on said trailer to deploy and retract a tarpaulin over said trailer;
   a pair of support units, each of said support units being coupled to said trailer, each of said support unit supporting a respective one of said arms, each of said support units being retainable at a selected angular position with respect to said trailer such that each of said arms is supported at said selected angular position, each of said support units transferring the weight of said tarpaulin into said trailer thereby inhibiting said arms from being damaged, each of said support units comprising a base having a first surface and a second surface, said first surface being coupled to said trailer having said second surface lying on a plane being horizontally oriented; and
   a pair of disks, each of said disks having a first side, a second side and an outer edge extending therebetween, said outer edge having a lower side and an upper side, said upper side of each of said disks being convexly arcuate and said lower side of each of said disks being straight, said lower side of each of said disks being coupled to said second surface of said base having each of said disks extending upwardly from said base, said disks being spaced apart from each other and being aligned with each other on said base, wherein each of said disks has a plurality of apertures extending through said first side and said second side, each of said apertures in a first one of said disks being aligned with a respective one of said apertures in a second one of said disks, said apertures on each of said disks being spaced apart from each other and being distributed along said upper side of said respective disk such that said apertures in each of said disks forms an arc extending upwardly from said second surface of said base.

2. The assembly according to claim 1, wherein each of said apertures defines a respective minimum position, maximum position or respective one of a plurality of medial positions.

3. The assembly according to claim 2, further comprising a member having a first end and a second end, said first end being positioned between said disks.

4. The assembly according to claim 3, further comprising a fastener extending through each of said disks and pivotally engaging said first end of said member such that said member is pivotally positioned between said disks, said member being alignable with selected ones of said apertures in said disks.

5. The assembly according to claim 3, further comprising a saddle being pivotally coupled to said second end of said member, said saddle slidably receiving a respective one of said arms of said tarpaulin unit, said saddle including a pair of uprights each extending away from said member, said respective arm being positioned between said uprights.

6. The assembly according to claim 5, further comprising a first pin being extendable through each of said uprights to retain said respective arm between said first pin and said member thereby inhibiting said respective arm from leaving said saddle.

7. The assembly according to claim 3, further comprising a second pin being extendable through a selected one of said apertures in each of said disks and engaging said member to retain said member in a selected one of said minimum, maximum or medial positions, said member transferring the weight of said tarpaulin from said respective arm into said base.

8. The assembly according to claim 7, wherein said tarpaulin is stretched a minimum distance when said member is retained at said minimum position thereby facilitating said tarpaulin to cover a trailer having a minimum length.

9. The assembly according to claim 8, wherein said tarpaulin is stretched to a maximum distance when said member is retained at said maximum distance thereby facilitating said tarpauling to cover a trailer having a maximum length.

10. The assembly according to claim 9, wherein said tarpaulin is stretched to differing medial lengths when said member is retained at a selected one of said medial positions thereby facilitating said tarpaulin to cover a trailer having a corresponding medial length.

11. A tarpaulin support assembly being configured to support tarpaulin arms at a selected angle on a trailer, said assembly comprising:
a trailer having a first lateral wall and a second lateral wall;
a tarpaulin deploying unit being movably coupled to said trailer, said tarpaulin deploying unit including a pair of arms each being pivotally positioned on a respective one of said first lateral side and said second lateral side of said trailer, each of said arms being urgeable into a selected angular orientation on said trailer to deploy and retract a tarpaulin over said trailer; and
a pair of support units, each of said support units being coupled to said trailer, each of said support unit supporting a respective one of said arms, each of said support units being retainable at a selected angular position with respect to said trailer such that each of said arms is supported at said selected angular position, each of said support units transferring the weight of said tarpaulin into said trailer thereby inhibiting said arms from being damaged, each of said support units comprising:
a base having a first surface and a second surface, said first surface being coupled to said trailer having said second surface lying on a plane being horizontally oriented;
a pair of disks, each of said disks having a first side, a second side and an outer edge extending therebetween, said outer edge having a lower side and an upper side, said upper side of each of said disks being convexly arcuate and said lower side of each of said disks being straight, said lower side of each of said disks being coupled to said second surface of said base having each of said disks extending upwardly from said base, said disks being spaced apart from each other and being aligned with each other on said base, each of said disks having a plurality of apertures extending through said first side and said second side, each of said apertures in a first one of said disks being aligned with a respective one of said apertures in a second one of said disks, said apertures on each of said disks being spaced apart from each other and being distributed along said upper side of said respective disk such that said apertures in each of said disks forms an arc extending upwardly from said second surface of said base, each of said apertures defining a respective one of a minimum position, a maximum position or a respective one of a plurality of medial positions;
a member having a first end and a second end, said first end being positioned between said disks;
a fastener extending through each of said disks and pivotally engaging said first end of said member such that said member is pivotally positioned between said disks, said member being alignable with selected ones of said apertures in said disks;
a saddle being pivotally coupled to said second end of said member, said saddle slidably receiving a respective one of said arms of said tarpaulin unit, said saddle including a pair of uprights each extending away from said member, said respective arm being positioned between said uprights;
a first pin being extendable through each of said uprights to retain said respective arm between said first pin and said member thereby inhibiting said respective arm from leaving said saddle; and
a second pin being extendable through a selected one of said apertures in each of said disks and engaging said member to retain said member in a selected one of said minimum, maximum or medial positions, said member transferring the weight of said tarpaulin from said respective arm into said base, said tarpaulin being stretched a minimum distance when said member is retained at said minimum position thereby facilitating said tarpaulin to cover a trailer having a minimum length, said tarpaulin being stretched to a maximum distance when said member is retained at said maximum distance thereby facilitating said tarpauling to cover a trailer having a maximum length, said tarpaulin being stretched to differing medial lengths when said member is retained at a selected one of said medial positions thereby facilitating said tarpaulin to cover a trailer having a corresponding medial length.

* * * * *